United States Patent [19]

Ohta

[11] Patent Number: 5,596,707
[45] Date of Patent: Jan. 21, 1997

[54] INFORMATION PROCESSING SYSTEM HAVING BACKUP/RECOVERY FACILITIES

[75] Inventor: Sadao Ohta, Kawasaki, Japan

[73] Assignee: Fujitsu Limited, Kawasaki, Japan

[21] Appl. No.: 384,230

[22] Filed: Feb. 6, 1995

Related U.S. Application Data

[63] Continuation of Ser. No. 109,600, Aug. 20, 1993, abandoned.

[30] Foreign Application Priority Data

Feb. 26, 1993 [JP] Japan ................................. 5-038127

[51] Int. Cl.$^6$ .................................................. G06F 11/00
[52] U.S. Cl. .................................................. 395/182.04
[58] Field of Search ........................ 395/182.03, 182.04, 395/182.05, 182.13, 181; 321/8.1

[56] References Cited

U.S. PATENT DOCUMENTS

| | | | |
|---|---|---|---|
| 4,755,928 | 7/1988 | Johnson et al. ......................... | 364/200 |
| 5,008,786 | 4/1991 | Thatte ..................................... | 364/200 |
| 5,159,671 | 10/1992 | Iwami .................................... | 395/250 |
| 5,175,849 | 12/1992 | Schnieder .............................. | 395/600 |
| 5,193,154 | 3/1993 | Kitajima et al. .................... | 395/182.04 |
| 5,212,784 | 5/1993 | Sparks ................................. | 395/182.04 |
| 5,226,157 | 7/1993 | Nakano et al. ........................ | 395/600 |
| 5,247,638 | 9/1993 | O'Brien et al. ........................ | 395/425 |
| 5,276,860 | 1/1994 | Fortier et al. ....................... | 395/182.04 |

Primary Examiner—Robert W. Beausoliel, Jr.
Assistant Examiner—Joseph E. Palys
Attorney, Agent, or Firm—Staas & Halsey

[57] ABSTRACT

An information processing system including a control table, which discriminates whether or not the data selected from a first external storage unit holding a large amount of data has been introduced in the main storage with reference to that control table. The data which has not been introduced in the main storage is transferred from the first external storage unit to the second external storage unit in certain units of volume via the buffer at the time of a backup operation. The data which has been introduced in the main storage is read out from the main storage and converted to the physical format in the first external storage unit and written in the second external storage unit. At the time of a recovery operation, the data is written from the second external storage unit into the first external storage unit in certain units of volume via the buffer, but when it is discriminated by the control table that the data is data which has been introduced in the main storage, this is written at also the corresponding position in the main storage.

10 Claims, 6 Drawing Sheets

INFORMATION PROCESSING SYSTEM HAVING BACKUP/RECOVERY FACILITIES

This application is a continuation of application Ser. No. 08/109,600, filed Aug. 20, 1993, now abandoned.

BACKGROUND OF THE INVENTION

1. Field of the Invention

The present invention relates to an information processing system having backup/recovery facilities, more particularly relates to a backup/recovery technique of data introduced in a main storage in that system.

In information processing systems, generally use is made of the technique of backing up data by loading data of a direct access storage device (DASD), for example, a magnetic disk unit, one type of external storage unit, in another external storage unit, such as a magnetic tape unit, to prepare against a fault or the like and recovering data by reading out the data from that other external storage unit when a fault occurs in the DASD.

So as to carry out such a backup/recovery, there is a method in which the data is physically read out and transferred from the DASD in certain units of volume in the order of the recordation and then is loaded in an external magnetic tape unit etc. In this method, however, the data (including a program) read out from the DASD to a main storage or a system storage unit (memory for expanding the main storage, abbreviated as SSU) is processed at a central processing unit (CPU), and therefore it is not the same as the original data. For this reason, so as to reliably perform the backup/recovery of the data, it is necessary to fetch also the contents loaded in the main storage (or SSU) into the magnetic tape unit etc.

2. Description of the Related Art

Conventionally, where backup/recovery is carried out, as will be explained later with reference to the drawings, to back up the data of the DASD after the data of the main storage is reflected in it, it is necessary to write the data in the main storage back to the DASD, so a long time is taken for performing the logical processing, for example, converting the address in the main storage to an address in the DASD. Further, after the data is written in the DASD, the data is further written in the magnetic tape unit etc. via a buffer of the main storage, and therefore there arises a problem in that the processing load for the backup was large and a long time was taken. Also, even when recovering the contents after backup, after the data is loaded in the DASD from that magnetic tape unit etc., it is necessary to further restore the state before the fault occurred by writing the same data as that immediately before the related backup is carried out into the main storage from the DASD, and therefore a problem of a long processing time occurred.

SUMMARY OF THE INVENTION

Therefore, an object of the present invention is to provide an information processing system having backup/recovery facilities of data introduced in the main storage, which can perform the backup of the data introduced in the main storage without writing data back to the DASD and which can efficiently perform the processing when restoring the contents after backup to the main storage.

To achieve the above-mentioned object, the system of the present invention is constituted in that it first is provided with a control table showing the region of the data introduced from the first external storage unit in the main storage in the first external storage unit. In the backup processing, if data which has not been introduced in the main storage is discriminated by that control table, that data is written in the magnetic tape unit etc. from that first external storage unit in certain units of volume, while the data which has been introduced in the main storage is read out from the main storage and written in the magnetic tape unit etc. In the recovery processing, the data read out from the magnetic tape unit etc. is written in the first external storage unit. At the same time, when it is discriminated that there is data which should be introduced in the main storage, that data is written at a corresponding address in the main storage. Thus, it is possible to perform backup of the data which has been introduced in the main storage without writing data back to the first external storage unit and thus to efficiently perform processing when restoring the contents after backup to the main storage.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the problems therein will be described with reference to the related figures.

Figure 1:
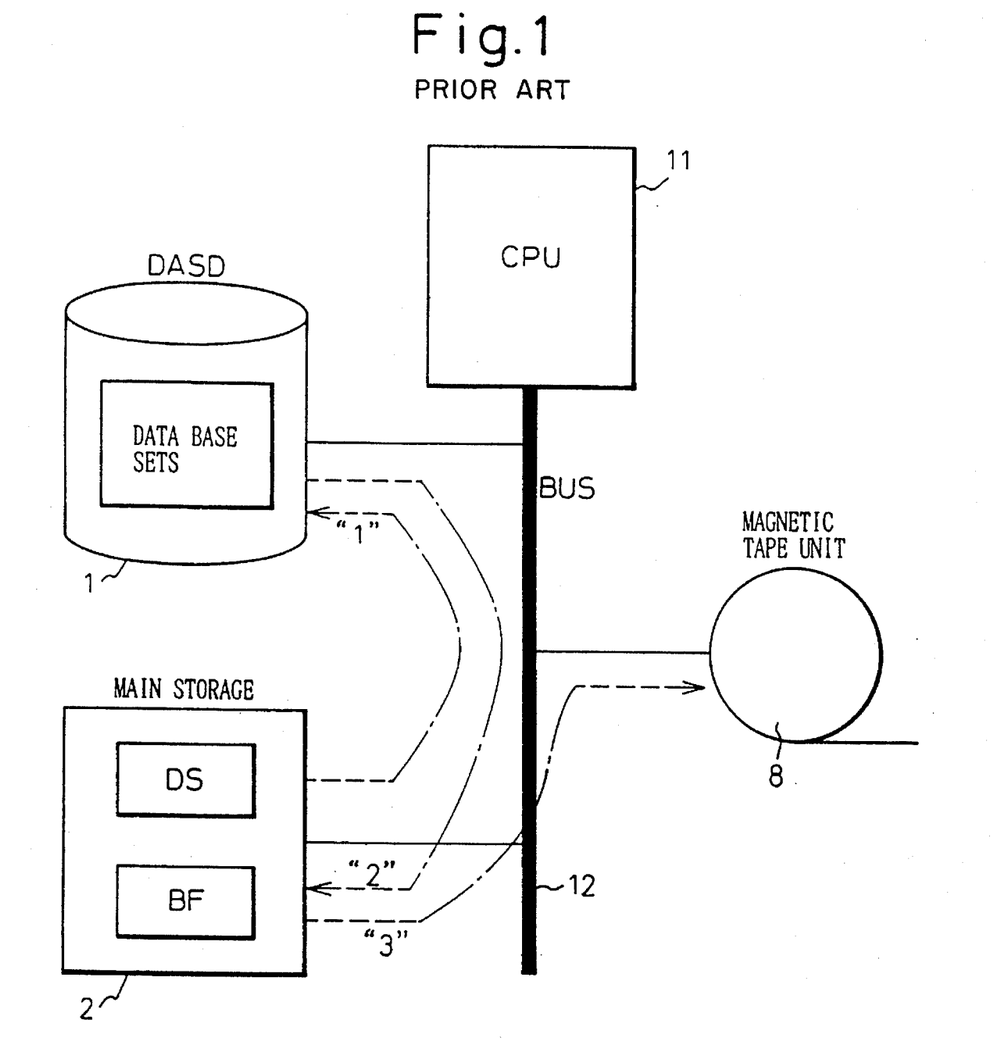
FIG. 1 is an explanatory view of the related art.

FIG. 1 is an explanatory view of the related art. In the system shown in FIG. 1, reference numeral 1 represents a DASD, which loads database sets; 2 is a main storage or SSU (hereinafter these will be simply referred to as the "main storage"), which takes the data out of the DASD 1 and performs the processing on it; 11 is a CPU; 8 is a magnetic tape unit, which is an external storage unit for the backup/recovery; and 12 is a bus.

Where the backup is performed in certain units of volume, physical records in the DASD 1 are sequentially read out from the head and loaded in the magnetic tape unit 8. In this method, in the case of the data (represented by DS) introduced in the main storage 2 among the data in the DASD 1, the contents have been changed by the processing of the CPU 11 and no longer coincide with the contents of the corresponding original data on the DASD 1 (which has not become the newest content). When backing up the DASD 1, including also the data DS which has been introduced in the main storage 21, conventionally the following has been carried out.

The data DS loaded in the main storage 2 is processed in units of the data set, and the data is written once into the DASD 1 for every data set (route of "1" of FIG. 1). When this writing is ended, the data of the DASD 1 is transferred to the main storage 2 for each unit of the data set, and the operations of loading data to the buffer (expressed by BF) therein (route of "2" of FIG. 1) and of writing data from the buffer BF into the magnetic tape unit 8 (route of "3" of FIG. 1) are repeatedly carried out. Also, when the data is recovered, the data is written into the DASD 1 from the magnetic tape unit 8 (inverse route to "2" and "3" of FIG. 1), then the necessary data is logically fetched from the DASD 1 to the main storage 2 and is written in the same (inverse route to "1" of FIG. 1).

In the related art shown in FIG. 1, as previously mentioned, after the data of the main storage 2 is reflected in it, the data of the DASD 1 is backed up. Therefore, when the data in the main storage 2 is written back in the DASD 1, it is necessary to perform logical processing, for example, convert the address in the main storage 2 to the address in the DASD 1, and therefore a long time is taken. After the data is written into the DASD 1, further, the data is written into the magnetic tape unit 8 via the buffer BF of the main storage 2, and therefore there was a problem in that the processing load for the backup operation was large and a long time was required. Moreover, also, when recovering the contents which were backed up, it is necessary to restore the state before the fault occurred by loading the data from the magnetic tape unit 8 into the DASD 1 and then further writing the data the same as the data immediately before the related backup was performed from the DASD 1 into the main storage 2. Therefore, there arose a problem of a long processing time.

Figure 2:
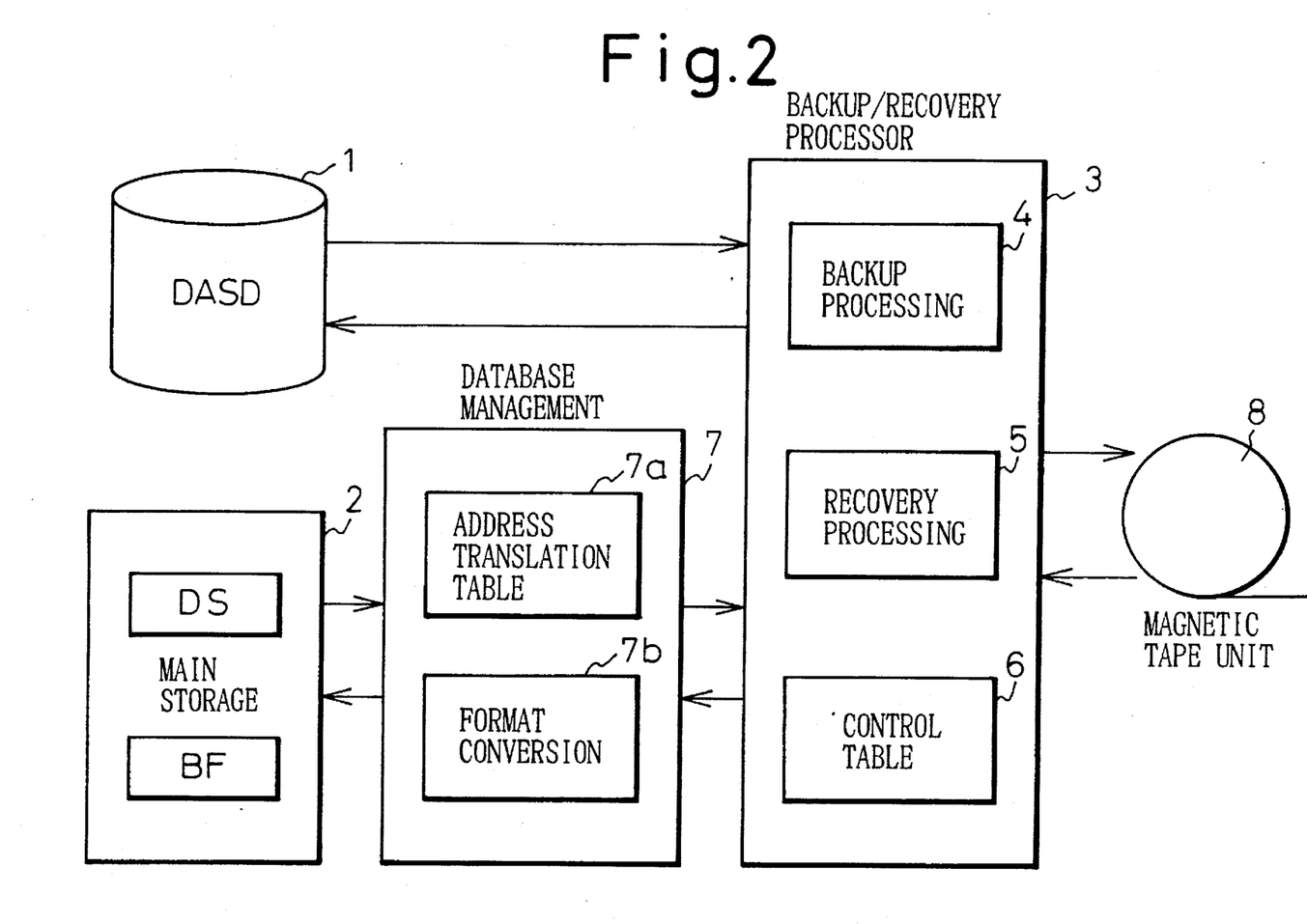
FIG. 2 is a structural view of the principle of the present invention.

FIG. 2 is a structural view of the principle of the present invention. Generally speaking, the information processing system according to the present invention comprises a main storage; a first external storage unit which holds a large amount of data partially selected from that main storage for use; a second external storage unit which saves the aforesaid large amount of data held in that first external storage unit; and a backup/recovery means including therein a control table showing the region of data, which was read out from the aforesaid first external storage unit and has been introduced in the aforesaid main storage, if any, in the first external storage unit, which backup/recovery means is operative, when backup processing is started, to write the data, which is discriminated to be not introduced in the aforesaid main storage with reference to the control table, from the aforesaid first external storage unit into the aforesaid second external storage unit in certain units of volume and to write the data, which is discriminated to be introduced in the aforesaid main storage unit with reference to the aforesaid control table, from the main storage into the aforesaid second external storage unit, and which backup/recovery means is operative, when the recovery processing is started, to read out the aforesaid data held in the aforesaid second external storage unit for the backup purpose and write it into the aforesaid first external storage unit and, when finding data which should be introduced in the aforesaid main storage with reference to the aforesaid control table, to write this data into the main storage.

In FIG. 2, reference numeral 1 represents a DASD, serving as the first external storage unit in which a large number of database (DB) sets are loaded; 2, a main storage (including an expanded memory such as an SSU); 3, a backup/recovery processing means; 4, a backup processing part; 5, a recovery processing part; 6, a control table holding information indicating in which region in the DASD 1 the data introduced in the main storage 2 is loaded; 7, a database management means which manages the data of the main storage 2 when backup/ recovery processing is carried out; 7a, an address conversion table which holds the information indicating the correspondence between the logical address in the main storage 2 and the physical address in the DASD; 7b, a format conversion part which performs the conversion of format between the format of the data in the main storage 2 and the format of the data in the DASD 1; and 8, a magnetic tape unit such as the second external storage unit. Note that, it is clear that the first external storage unit is not restricted to a DASD and that other external storage units can be used. Similarly, it is clear also that the second external storage unit is not restricted to a magnetic tape unit and that other external storage units can be used.

According to the present invention, when performing backup processing, physical backup is carried out in certain units of volume from the first external storage unit 1 to the second external storage unit 8 and the data introduced in the main storage 2 is written from the main storage 2 into the second external storage unit 8. When performing recovery processing, the data is directly transferred from the second external storage unit 8, in which the data which was backed up was written, to the first external storage unit 1 and, at the same time, the data which had been introduced in the main storage during the backup is directly written into the main storage 2.

When the start of a backup operation is instructed, the backup processing part 4 of the backup/recovery processing means 3 is started. The backup processing part 4 reads out the data from the head address of the first external storage unit 1 DASD and writes that data into a magnetic tape unit serving as the second external storage unit 8 (hereinafter simply referred to as a "magnetic tape unit"). In this case, the backup processing part 4 judges whether or not the read out position of the DASD 1 (physical address) corresponds to the region of introduction in the main storage 2 (logical address) with reference to the control table 6. Where that read out position is a region in which data has not been introduced in the main storage 2, it writes the data as is into the magnetic tape unit 8 from the DASD 1 via the buffer of the main storage. Conversely, where that read out position is a region in which data was introduced in the main storage 2, it fetches the related data from the main storage 2 via the database management means 7.

Namely, the database management means 7 converts the address of the DASD 1 to the address of the main storage 2 by the address conversion table 7a when the data of the DASD has been introduced in the main storage 2, reads out the data from the main storage 2 by that address, converts that data to the format used for the DASD in the format conversion part 7b, and transmits the same. That data is written into the magnetic tape unit 8 by the backup/recovery processing means 3. The other data, which has not been written into the main storage 2, is physically sequentially written from the DASD 1 into the magnetic tape unit 8 in the order of the address via the buffer of the main storage for performing the backup. As described above, the data is read out from the main storage 2 and that data is converted to a format adapted to the DASD in the format conversion part 7b and then written into the magnetic tape unit 8. By this, the necessity of performing different control depending upon whether or not the data to be recovered is the data which should be returned into the main storage 2 is eliminated. Thus, an improvement of the efficiency of processing at the time of a recovery operation can be achieved.

When the start of a recovery operation is instructed, the recovery processing part 5 in the backup/recovery processing means 3 reads the data of the magnetic tape unit 8 which has been backed up by the above-described operation and writes the data into the DASD 1 via the buffer of the main storage. At this time, the contents of the control table 6 in the backup/recovery processing means 3 and the address conversion table 7a in the database management means 7 at the time of the backup are set. The recovery processing part 5 discriminates whether or not the data is data which has been introduced in the main storage 2 among the data to be written into the DASD 1 with reference to the control table 6. Where it is data which should be introduced in the main storage 2, that data is written into the main storage 2 via the database management means 7. The database management means 7 converts the physical address of that data in the DASD 1 by the address conversion table 7a to find the logical address in the main storage 2, converts that data (having the format adapted to the DASD) to the format adapted to the main storage 2 using the format conversion part 7b, and then writes the same in the main storage 2.

Figure 3:
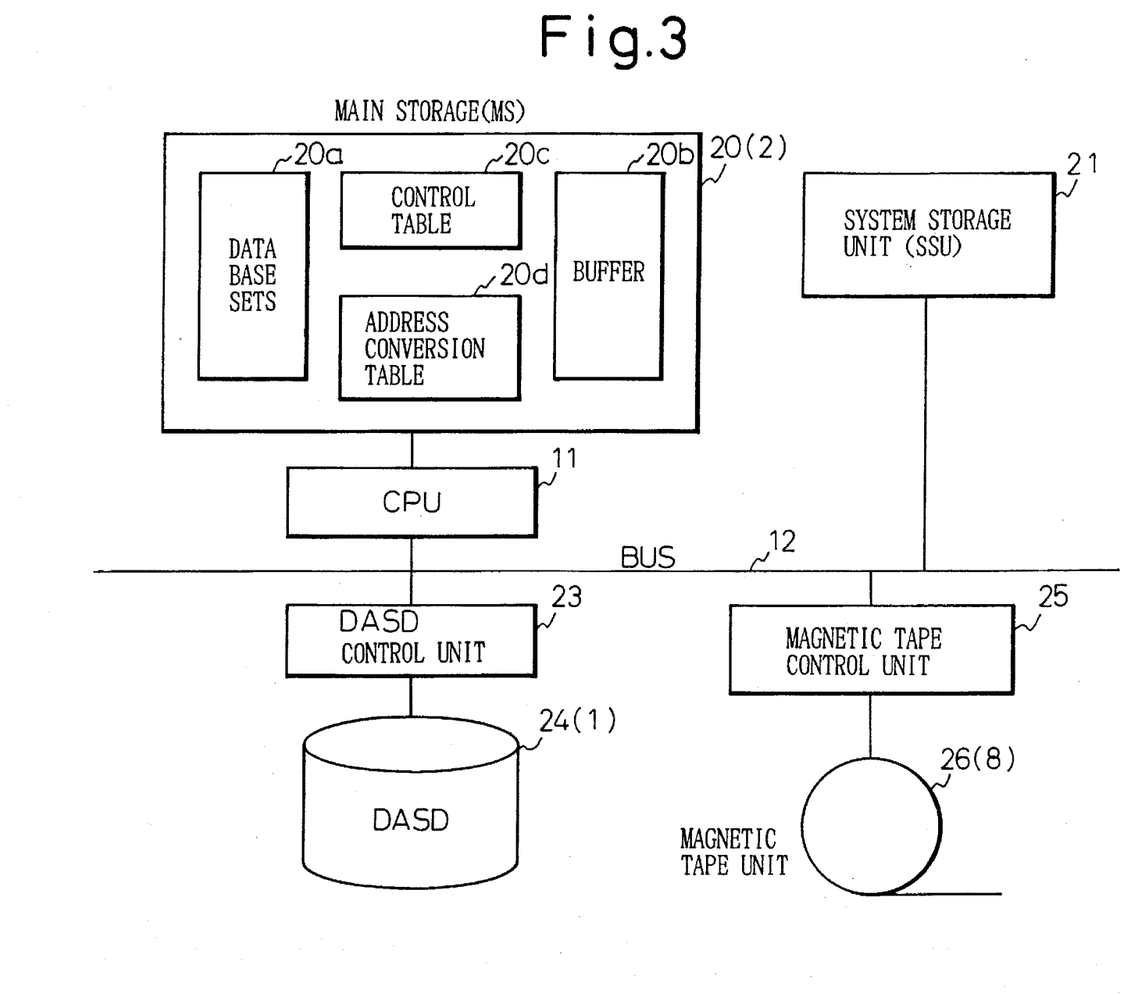
FIG. 3 is a structural view of hardware of an embodiment.
Figure 4:
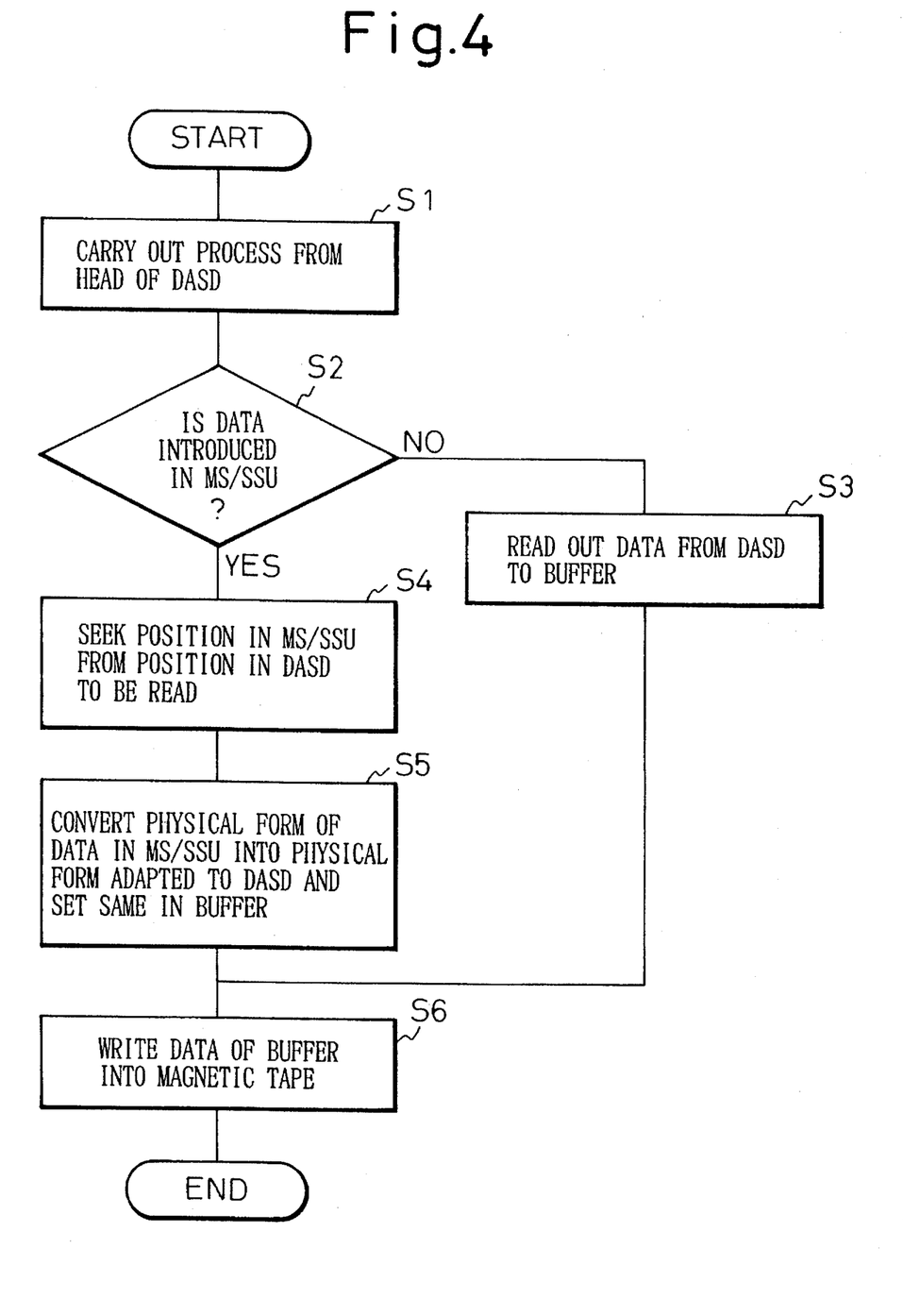
FIG. 4 shows the flow of processing in the case of backup.
Figure 5:
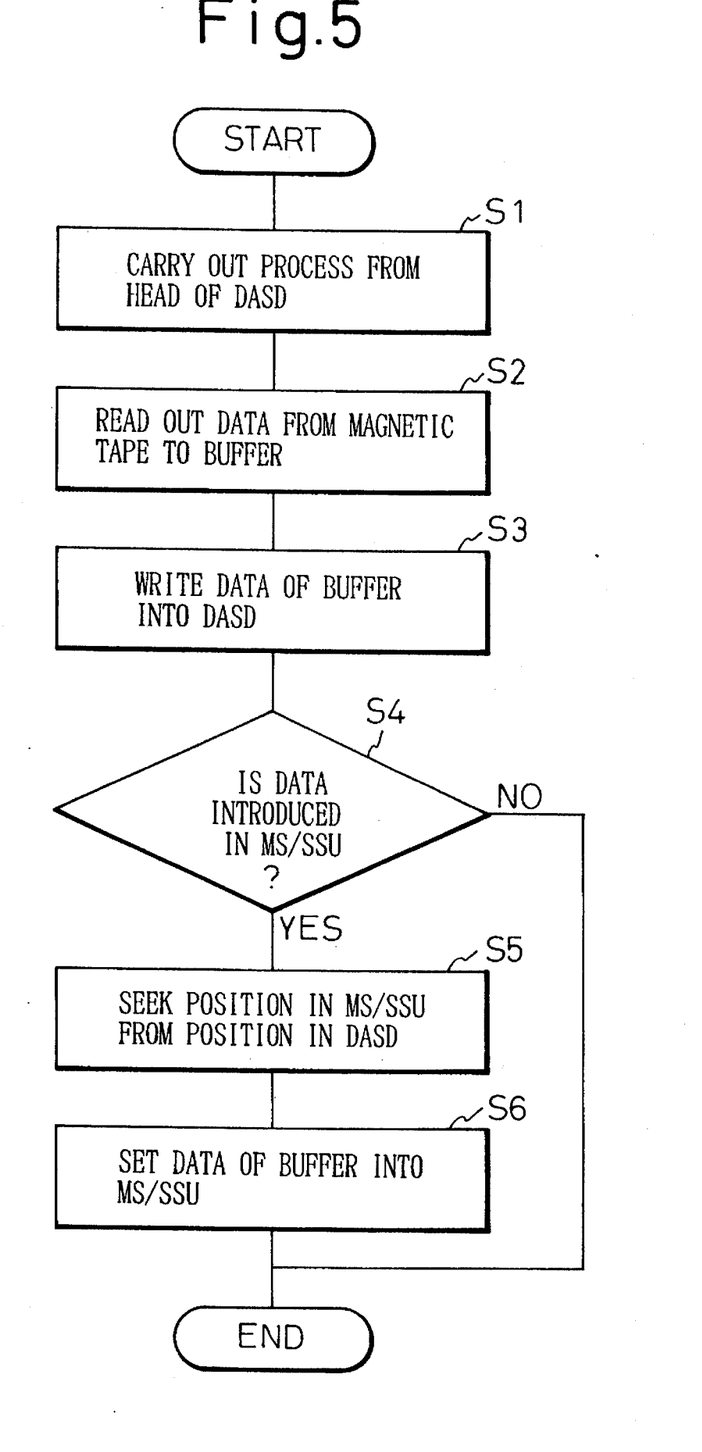
FIG. 5 shows the flow of processing in the case of recovery.
Figure 6:
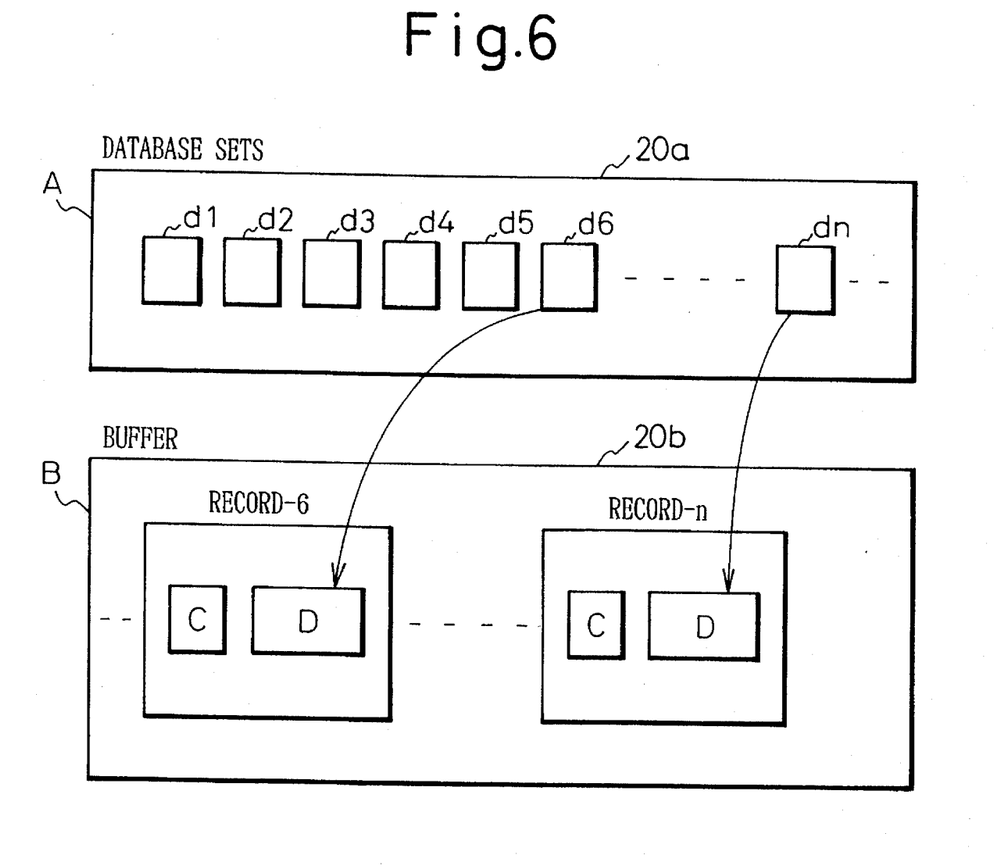
FIG. 6 is a view explaining a conversion of a data format in the main storage.

FIG. 3 is a structural view of the hardware of the embodiment; FIG. 4 shows the flow of processing of the backup operation; FIG. 5 shows the flow of processing of the recovery operation; and FIG. 6 is an explanatory view of the setting of data from the main storage to the buffer.

In FIG. 3, 20 shows a main storage (corresponding to the previously mentioned main storage 2); 21, an SSU; 11, a CPU; 23, a DASD control unit; 24, a DASD which stores the database (DB) sets, for example, a hard disk (corresponding to the previously mentioned DASD 1); 25, a magnetic tape control unit; and 26, a magnetic tape unit (corresponding to the previously mentioned magnetic tape unit 8).

In FIG. 3, among the large number of databases stored in the DASD 24, the database to be processed is selectively read into the main storage 20 and loaded as the database sets 20a. The CPU 11 performs data processing on the database sets 20a. Reference numeral 20b shown in the main storage 20 represents a buffer used for the data transfer; 20c is a control table holding information indicating which region of data on the DASD the data introduced as the database sets 20a in the main storage 20 is; and 20d is an address conversion table for performing the address conversion between the logical address of the database sets 20a in the main storage 20 and the physical address in the DASD 24.

Note that, there also exists a case where the database sets 20a read out from the DASD 24 are loaded in the SSU (expanded memory) 21 and the processing is carried out, but in the following explanation, an example in which the database is loaded only in the main storage 20 will be explained. However, processing similar to that in the case of the main storage 20 is carried out also in a case where the database is loaded in the SSU 21.

In the structure of FIG. 3, the processing of the backup/recovery operation of the present invention is carried out by the control of CPU 11. The flows of processing thereof will be shown in FIG. 4 and FIG. 5.

The flow of processing of the backup shown in FIG. 4 will be explained with reference to the structure indicated in FIG. 3. The backup processing is carried out in certain units of volume, as mentioned previously. The processing is carried out while incrementing the address one by one from the head of the DASD 24 (the address starts from "0000") (S1 of FIG. 4). At this time, it is decided whether the data loaded at the read out address of the DASD 24 is data introduced in the main storage (MS) 20 with reference to the control table 20c (S2 of same view). Where that data has not been introduced in the main storage 20, the data from the DASD 24 is once read into the buffer 20b (S3 of same view). On the other hand, when it is seen that it is data which has been introduced in the main storage 20, by converting the related read out address on the DASD 24 to the logical address of the database in the main storage 20 using the address conversion table 20d, the position in the main storage 20 is found (S4 of same view). Then, the physical format of data in the main storage is converted to the physical format in the DASD and the data is set in the buffer 20b (S5 of same view). Subsequently, the data in the buffer 20b is written into the magnetic tape unit 26 via the magnetic tape control unit 25 (S6 of same view).

The operation for converting the data in the main storage 20 to the physical format in the DASD and setting the same in the buffer 20b (S5 of FIG. 4) in the above-described backup processing will be explained using FIG. 6.

FIG. 6 is a view for explaining the format conversion of data in the main storage 20. As shown in the top section A, data (records) d1, d2, . . . introduced as the database sets 20a in the main storage 20 (having a physical format in the main storage) are converted to the physical format in the DASD 24 as shown in the bottom section B by the CPU 12 and loaded in the buffer 20b. In section B, C is a count part, in which the physical address in the DASD and the length of data are written. Also, D is a data part, in which the contents of the related data have been written. In this format conversion operation, first, the above-described count part C is set in the buffer 20b, the data D is fetched using the logical address in the main storage obtained by the processing of step 4 of the above-described FIG. 4 and is copied in the buffer 20b.

Next, the flow of processing of the recovery operation shown in FIG. 5 will be explained with reference to the structure of FIG. 3.

The recovery processing is also carried out in certain units of volume mentioned previously. The processing is carried out while incrementing the address one by one from the head of the DASD 24 (the address starts from "0000") (step 1 of FIG. 5). The data is read into the buffer 20b from the magnetic tape unit 26 via the magnetic tape control unit 25 (S2 of same view). Next, the data in the buffer 20b is written into the DASD 24 (S3 of same view). At this time, it is decided whether or not the related data is data introduced in the main storage 20 with reference to the control table 20c, by the physical address in the DASD 24 (S4 of same view). Where that data has not been introduced in the main storage, the data is written in the DASD and the processing is ended, but where it is data which has been introduced, the CPU 12 finds the address in the main storage 20 from the writing address in the DASD 24 using the address conversion table 20d (S5 of same view). Further, it sets the data in the buffer 20b at the address in the main storage 20 found in the above way.

According to the present invention, where a volume including a database which has been introduced in the main storage or SSU is backed up and recovered in units of that volume, it is not necessary to once return the data which has been introduced in the main storage or SSU to the DASD and perform the backup for the same as in the related art, and accordingly it is not necessary to transfer the data along the route "1" of FIG. 1, and thus high speed backup and recovery processing can be realized.

What is claimed is:

1. An information processing system provided with backup/recovery facilities, comprising:

a main storage;

a first external storage unit which holds a large amount of data partially selected by main storage for use;

a second external storage unit which saves the aforesaid large amount of data held in that first external storage unit;

a control table being operative to show a region in said first external storage unit of data which is held in said main storage; and backup/recovery means for backing up and recovering data, which backup/recovery means is operative, when backup processing is started, to write data, which is discriminated to be not introduced in the aforesaid main storage with reference to the control table, from the aforesaid first external storage unit into the aforesaid second external storage unit in certain units of volume and to write the data, which is discriminated to be introduced in the aforesaid main storage with reference to control table, from the main storage into the aforesaid second external storage unit, and which backup/recovery means is operative, when the recovery processing is started, to read out the aforesaid data held in the aforesaid second external storage unit for the backup purpose and write it into the aforesaid first external storage unit and, when finding data which should be introduced in the aforesaid main storage with reference to the aforesaid control table, to write this data into the main storage wherein a database management means is formed between the aforesaid backup/recovery means and the aforesaid main storage;

wherein said database management means has an address conversion table which displays, for data introduced in the aforesaid main storage, the correspondence between logical addresses of the data in said main storage and the physical addresses of said data in the aforesaid first external storage unit; and wherein said database management means is operative, when the aforesaid backup processing is started, to output the data read out from the aforesaid main storage, as data given the physical address of the related data in the aforesaid first external storage unit with reference to the aforesaid address conversion table, to the aforesaid second external storage unit and said database management means is operative, when the aforesaid recovery processing is started, to discriminate, for the data read out from said second external storage unit and having a physical address of the related data in the aforesaid first external storage unit, the logical address of said data in the aforesaid main storage corresponding to that physical address with reference to the aforesaid address conversion table and then to write the data in that logical address in said main storage.

2. An information processing system as set forth in claim 1, wherein the aforesaid database management means further has format conversion facilities for performing mutual conversion between the format of the data held in the aforesaid main storage and the format of the data held in the aforesaid first external storage unit and the aforesaid database management means is operative, when the aforesaid backup processing is started, to convert the format of data to be written from the aforesaid main storage into the aforesaid second external storage unit to the format of the data held in the aforesaid first external storage unit and said database management means is operative, when the aforesaid recovery processing is started, to convert the data which is to be written in the aforesaid main storage among the data held in the aforesaid second external storage unit to the format in said main storage with the same format as the format of the data which is held in the aforesaid first external storage unit and then to write the data into said main storage.

3. An information processing system as set forth in claim 2, wherein the aforesaid main storage includes a database region for holding the data selectively read out from the aforesaid first external storage unit, a region for forming the aforesaid control table, a region for forming the aforesaid address conversion table, and a buffer region temporarily holding the data which is transferred in the related information processing system.

4. An information processing system as set forth in claim 3, wherein contents immediately before the aforesaid backup processing is started are stored as the contents of the aforesaid control table in the aforesaid main storage and as the contents of the aforesaid address conversion table.

5. An information processing system as set forth in claim 3, wherein the data transferred between the aforesaid main storage, the aforesaid first external storage unit, and the aforesaid second external storage unit when the aforesaid backup processing and the aforesaid recovery processing are started are transferred via the aforesaid buffer region in the aforesaid main storage.

6. An information processing system as set forth in claim 5, wherein in both of a case where the data is transferred from the aforesaid first external storage unit to the aforesaid second external storage unit at the aforesaid backup processing and a case where the data is transferred from the aforesaid second external storage unit to the aforesaid first external storage unit at the aforesaid recovery processing, the transfer of said data is carried out in certain units of volume, and the data is sequentially transferred while incrementing the address one by one from the head address in said first external storage unit.

7. An information processing system as set forth in claim 2, wherein the format of the data held in the aforesaid second external storage unit is composed of a pair comprising a count part which displays the physical address of the related data in the aforesaid first external storage unit and the length of that data and a data part which displays the contents of the related data.

8. An information processing system as set forth in claim 1, wherein the aforesaid main storage includes an expanded memory added to the related information processing system.

9. An information processing system provided with backup/recovery facilities comprising:

a first external storage unit restoring data;

a main storage into which data from the first external storage unit is introduced;

a second external storage unit, which saves data stored in first external storage unit;

a control table stored in a memory and indicating a region of data, which has been introduced in the main storage;

backup means for determining whether the region of data has been introduced in the main storage with reference to the control table, for writing data not introduced in the main storage from the first external storage unit to the second external storage unit, and for writing data introduced in the main storage from the main storage to the second external storage unit; and recovery means for writing data from the second external storage unit to the first external storage unit if data was not introduced in the main storage, and for writing data from the second external storage unit to the main storage if the region of data was introduced in the main storage with reference to the control table, wherein a database management means is connected to the main storage;

wherein said database management means has an address conversion table which displays, for data introduced in said main storage, the correspondence between logical addresses of the data in said main storage and the physical addresses of said data in said first external storage unit; and wherein said database management means is operative, when said backup processing is started, to output the data read out from said main storage, as data given the physical address of the related data in said first external storage unit with reference to said address conversion table, to said second external storage unit and said database management means is operative, when the aforesaid recovery processing is started, to discriminate, for the data read out from said second external storage unit and having a physical address of the related data in said first external storage unit, the logical address of said data in said main storage corresponding to that physical address with reference to said address conversion table and then to write the data in that logical address in said main storage.

10. An information processing system provided with backup/recovery facilities comprising:

a first external storage unit restoring data;

a main storage into which data from the first external storage unit is introduced;

a second external storage unit, which saves data stored in first external storage unit;

a control table stored in a memory and indicating a region of data, which has been introduced in the main storage;

backup means for determining whether the region of data has been introduced in the main storage with reference to the control table, for writing data not introduced in the main storage from the first external storage unit to the second external storage unit, and for writing data introduced in the main storage from the main storage to the second external storage unit; and recovery means for writing data from the second external storage unit to the first external storage unit if data was not introduced in the main storage, and for writing data from the second external storage unit to the main storage if the region of data was introduced in the main storage with reference to the control table, wherein:

said database management means further has format conversion facilities for performing mutual conversion between the format of the data held in said first external storage unit, and said database management means is operative, when said backup processing is started, to convert the format of data to be written from said main storage into said second external storage unit to the format of the data held in said first external storage unit and said database management means is operative, when said recovery processing is started, to convert the data which is to be written in said main storage among the data held in said second external storage unit to the format in said main storage with the same format as the format of the data which is held in said first external storage unit and then to write the data into said main storage.

* * * * *